(12) United States Patent
Kletter

(10) Patent No.: US 6,671,071 B1
(45) Date of Patent: Dec. 30, 2003

(54) THRESHOLD BIAS CIRCUITS FOR ENHANCED COLOR ERROR DIFFUSION

(75) Inventor: Doron Kletter, San Mateo, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/421,063

(22) Filed: Oct. 19, 1999

(51) Int. Cl.[7] .................. H04N 1/40; G06F 15/00; G06K 1/00
(52) U.S. Cl. .............. 358/1.9; 358/3.03; 358/3.14; 358/3.19; 358/3.22; 358/466; 358/456; 358/534; 358/535; 358/536; 382/270; 382/252; 382/255
(58) Field of Search .................. 358/1.9, 3.03, 358/3.14, 3.19, 3.22, 466, 456, 534, 535, 536, 3.13, 3.23; 382/270, 252, 255

(56) References Cited

U.S. PATENT DOCUMENTS

| | | | | |
|---|---|---|---|---|
| 5,565,994 A | | 10/1996 | Eschbach | 358/298 |
| 5,581,371 A | * | 12/1996 | Spaulding et al. | 358/3.03 |
| 5,621,546 A | * | 4/1997 | Klassen et al. | 358/536 |
| 5,757,517 A | * | 5/1998 | Couwenhoven et al. | 358/463 |
| 5,870,503 A | * | 2/1999 | Kumashiro | 382/252 |
| 5,917,614 A | * | 6/1999 | Levien | 358/3.03 |
| 5,931,960 A | * | 8/1999 | Kletter et al. | 714/704 |
| 6,014,233 A | * | 1/2000 | Fan et al. | 358/515 |
| 6,042,211 A | * | 3/2000 | Hudson et al. | 347/15 |
| 6,072,591 A | * | 6/2000 | Harrington | 358/1.9 |
| 6,266,157 B1 | * | 7/2001 | Fan et al. | 358/1.9 |
| 6,363,172 B1 | * | 3/2002 | Cheung et al. | 382/167 |
| 6,512,597 B1 | * | 1/2003 | Cooper et al. | 358/1.9 |
| 2002/0186267 A1 | * | 12/2002 | Velde et al. | 347/15 |
| 2003/0038953 A1 | * | 2/2003 | Damera-Venkata | 358/1.9 |

* cited by examiner

Primary Examiner—Kimberly A. Williams
Assistant Examiner—Melanie Vida
(74) Attorney, Agent, or Firm—Fliesler Dubb Meyer & Lovejoy LLP

(57) ABSTRACT

A circuit for generating a threshold bias signal for processing n color separations representing a color image includes a threshold bias register which holds and outputs the current threshold bias signal.

23 Claims, 5 Drawing Sheets

THRESHOLD BIAS CIRCUITS FOR ENHANCED COLOR ERROR DIFFUSION

BACKGROUND OF THE INVENTION

1. Field of the Invention

The present invention relates to the field of rendering continuous tone color images to binary patterns of color dots for the purpose of printing or displaying on binary devices. Specifically, the present invention relates to performing error diffusion on color separations while maintaining minimum interaction distances between dots of different colors on binary color devices.

2. Discussion of the Related Art

Most Thermal and Piezo Ink Jet-devices are typically designed to operate as binary devices, whereby each output pixel location on the page can be turned either on or off. The main reason for this is that the precise jet-timing is a complicated function of the specific head design, the ink drying properties, the print mode (uni- or bi-directional) and fill pattern, and the order of firing. Most vendors of ink jet print heads prefer to integrate this functionality into an Application Specific Integrated Circuit (ASIC) that is either embedded with the head (inkjet cartridge) or used externally to drive it. Either way, the head appears to be a binary device to the system interface. A true color device would need the equivalent of the three (CMY) or four (CMYK) rendered separation bitmaps to generate the color output. The data does not have to be generated all at once, but can be produced in bands covering the head vertical (slow scan) extent. data does not have to be generated all at once, but can be produced in bands covering the head vertical (slow scan) extent.

A conventional approach for generating the color data is by error-diffusing each color plane independently. The method is simple and bandwidth efficient, but the output quality is limited. Individual color dots may overlap each other in an arbitrary matter, and this can cause color hue shifts and undesired artifacts. To illustrate the problem, consider a simple case of a light solid gray area being rendered in three colors (CMY, with C=M=Y). For the case of independent planes and all else being the same (random seed included), the color planes are identical and therefore would tend to have a perfect dot overlap. Any given dot location would be turned either on or off in all the three planes simultaneously. However, even the slightest disturbance (due to noise, random seed differences, or even some prior colored data on the page with uneven CMY values) can easily brake this lock and cause the dots in one plane to be rendered away from the dots belonging to the other planes. The resulting effect is that instead of a uniformly (orderly random) sequence of nearly black dots, the output is now composed of three times as many (random) color dots. Every now and then, two or more of these dots will overlap at random, thereby creating secondary color artifacts and patterns (worms). Depending on the output resolution, these artifacts can often be quite visible.

With CMYK, used for high-quality printing, the problem can be even more pronounced. The K channel is typically generated from the CMY data based on some Gray Component Replacement (GCR) or Under Color Removal (UCR) algorithm. A portion of the common CMY component is removed and replaced with a proportional amount of K according to a pre-determined rule. However, the black ink is typically made very dense and light absorbent for good reproduction of black text. Thus, not only is an increase resultant in the number of possible combinations for interaction between two or more colored dots, but some of the combinations are more visible. For example, black plus any other color will be perceived as black, and will be much more visually noticeable than, for example, yellow.

Several techniques have been proposed in the literature to overcome the above limitations. One example is the so called Vector Error Diffusion, where multi-planar error diffusion in 3P or 4P is used instead of the three or four single plane independent error diffusion. (The symbol P stands for "planes" and measures the dimensionality of the space being considered.) At each pixel, a vector is calculated from the compensated pixel value to all the possible dot outcomes, and the closest output is selected based on the shortest distance or some other criteria. The (multi-dimensional) error between the desired pixel color and the selected output is than propagated to the nearby neighborhood in the conventional error-diffusion manner. The Vector Error Diffusion is not commonly employed, despite the potential for higher output quality, mainly due to the greater computational complexity and larger bandwidth resulting from having to process the CMYK data all at once.

As is apparent from the above discussion, a need exists for resolving problems associated with interactions of different color dots without requiring complete processing of all of the color planes simultaneously.

SUMMARY OF THE INVENTION

Error Diffusion is a well-known technique for rendering continuous tone images to binary pattern of dots for the purpose of printing or displaying on a binary device. It is the preferred method of choice for driving relatively low-resolution thermal or Piezo inkjet devices. The method has been extended to color via the so-called vector error diffusion, but the solution requires the processing of all the color planes simultaneously. The vector error diffusion is seldom applied to the very low cost inkjet devices due to its significantly increased bandwidth and complexity. The result is a much compromised image quality. A need exists for a new and effective technique to achieve the vector error diffusion image quality without the associated computational complexity. An object of the present invention is to leverage the generic inkjet properties and to eliminates the secondary and higher-order dot interactions by maintaining a minimum interaction distance (MID). An object of the present invention is to provide circuits for implementing a method for eliminating the color dependency limitations. Unlike the Vector Error Diffusion, the present invention is simple, sequential, and extremely suitable for high-speed implementation.

According to an embodiment of the present invention, a circuit for generating a threshold bias signal for processing n color separations representing a color image includes a threshold bias register which holds and outputs the current threshold bias signal. A threshold bias adder computes and outputs an adjusted threshold bias signal for use during a next separation corresponding to the same pixel position.

According to an aspect of the present invention, the circuit for generating a threshold bias signal includes a threshold bias adjustment circuit which contributes a threshold bias adjustment signal for use during the next processing cycle which is a function of the output pixel state signal for the current color separation and is a function of the current and next color separations of the current pixel. When the output pixel state signal for the current color separation indicates that the pixel is turned off, then the threshold bias adjustment signal is zero. If the pixel is turned on, then the threshold bias adjustment signal is a non-zero value dependent upon the current and next color separations. By adding a non-zero threshold bias adjustment signal, the likelihood of turning on another color in another separation in the same pixel position is reduced.

According to another aspect of the present invention, the circuit for generating the threshold bias signal includes a threshold bias recycling circuit which contributes a portion of the previous threshold bias value used for the previous pixel in the same color separation. This is used when the minimum interaction distance between two pixels of differing colors is greater than one pixel. The contents of the threshold bias register are stored in a threshold bias recycling memory for processing the same separation of the next pixel. To prepare for the next separation of the current pixel, the previous threshold bias value corresponding to the previous pixel in the next color separation is multiplied by a factor less than one before being added to the current threshold bias value.

According to yet another aspect of the present invention, a comparator compares the adjusted pixel input with an adjusted threshold input to determine the output pixel state signal for the current pixel and current separation. The adjusted threshold input is computed by adding the contents of the threshold register with the contents of the threshold bias register. The adjusted pixel input results from the error diffusion process. The output pixel state signal is used to determine the threshold bias adjustment value discussed above.

The color separations are processed in a reversed-interleaved fashion according to the present invention. For example, in a CMYK color system (cyan, magenta, yellow, and black), the the first pixel of the K separation is processed, then the first pixel of the Y separation, then the first pixel of the M separation, then the first pixel of the C separation before progressing to the second pixel.

These and other features, aspects, and advantages of the present invention are fully explained in the Detailed Description of the Invention.

BRIEF DESCRIPTION OF THE DRAWINGS

In the Figures, like parts are referenced with like reference numerals. The Figures are more thoroughly explained in the Detailed Description of the Invention.

DETAILED DESCRIPTION OF THE INVENTION

Error diffusion is a well known technique for rendering continuous tone images to binary pattern of dots for the purpose of printing or displaying on a binary device. The error diffusion technique is often the preferred method of rendering for low to medium resolution devices (under 600 dots per inch), particularly so since the error diffusion method does not embody a pre-determined threshold array as in the traditional clustered dot screening techniques. The lack of any such structured cell enables the error diffusion to rapidly track the input data, making it more capable of rendering high frequency detail. The alternative methods require large-size arrays to accommodate a sufficient number of gray levels as needed for high quality reproduction. It has been determined that the human vision system can only distinguish between some 200 shades or gray. The large size arrays can quickly become visually noticeable in the output, particularly on a low resolution device. Thus, image quality must be compromised between the number of gray levels and the array visibility.

The following is a brief description of the error diffusion technique suitable for color images. The method typically involves a single pass over the input image for each separation, during which each color pixel is processed sequentially. The color separations are typically processed one band at a time. The processing for each separation consists of thresholding the input pixel value and replacing it with one of two values, on or off. As each pixel is so changed, an error is introduced to the local gray level of the image. This error is used to adjust the values of the neighboring pixels to preserve the local gray level prior to thresholding. In order to avoid multiple passes over the image, the error is only propagated (or "diffused") among future pixels that have not been processed yet (e.g., to pixels located to the right and below the current pixel for a left-to-right scan order). Several methods for determining how to distribute the error among the neighboring pixels exist in the literature.

Figure 1:
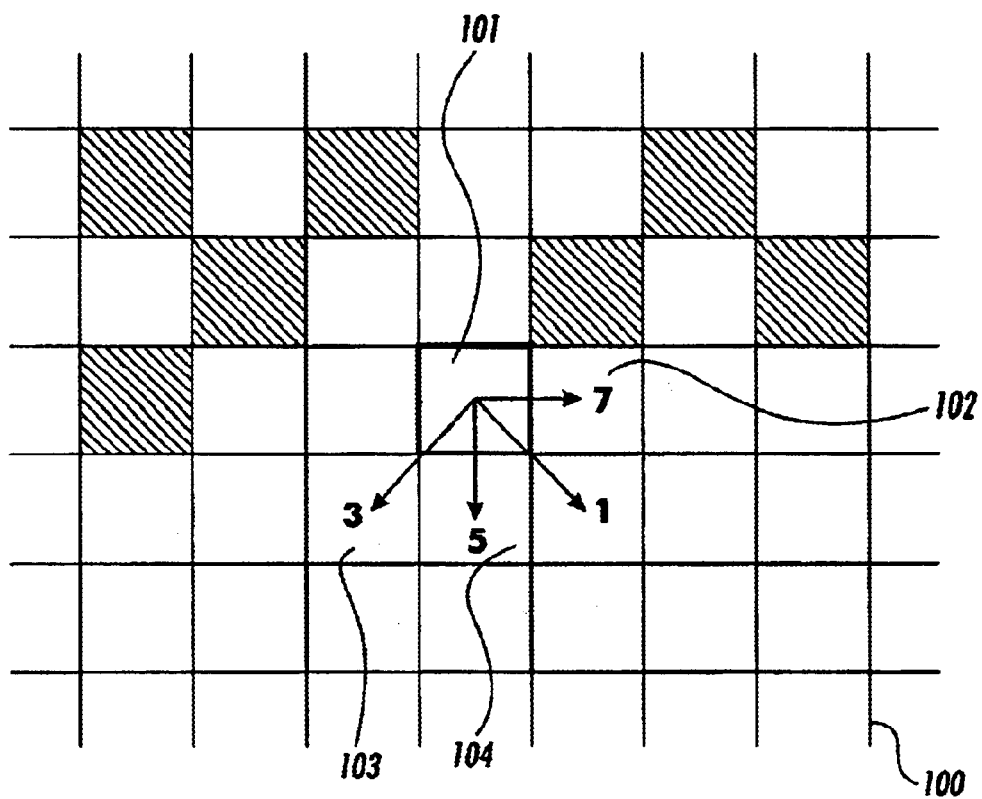
FIG. 1 is a prior art figure illustrating a suitable error diffusion technique for processing each color separation of a color implemented by the circuits according to the present invention.

FIG. 1 demonstrates the principles of the Error Diffusion technique for each color separation. It should be noted that FIG. 1 and the scheme shown in it was originally derived by Floyd & Steinberg, and are included here only for the purpose of illustration. This example will be used to demonstrate the technique according to the present invention and its implementation.

Referring to FIG. 1, the squares correspond to the input image pixels on a raster grid 100. The black and white pixels were already processed, thresholded, and binarized to be either on or off. The shaded pixels have not yet been processed. The center pixel 101, surrounded by a dark frame, is the current pixel to be processed next. The arrows leading from the current pixel 101 indicate how the current thresholding error is to be distributed to the neighboring pixels. It is often referred to as the error diffusion filter in the literature. The numbers along the arrows describe the (possibly varying) non-normalized relative neighbor weight. For example, the number 7 associated with the pixel 102 immediately to the right of the current pixel 101 indicates that 7/16 of the error will be used to adjust this pixel, where 16 is the normalization factor equal to the total sum of the weights. As each of these neighbors is so adjusted, its associated gray value is changed (making it darker or lighter depending on the sign of the error), and the updated value is what in turn will be used for thresholding the neighboring pixels.

Based on the above description, the conventional Error Diffusion technique can be seen to be composed of the following three basic steps: (1) a thresholding step in which the current pixel is compared with a given threshold; (2) followed by an error compensation step, where the error is adjusted by subtracting the binary output level; and finally, (3) the error is distributed to the neighboring pixels. The process then advances by one pixel and repeats.

Figure 2:
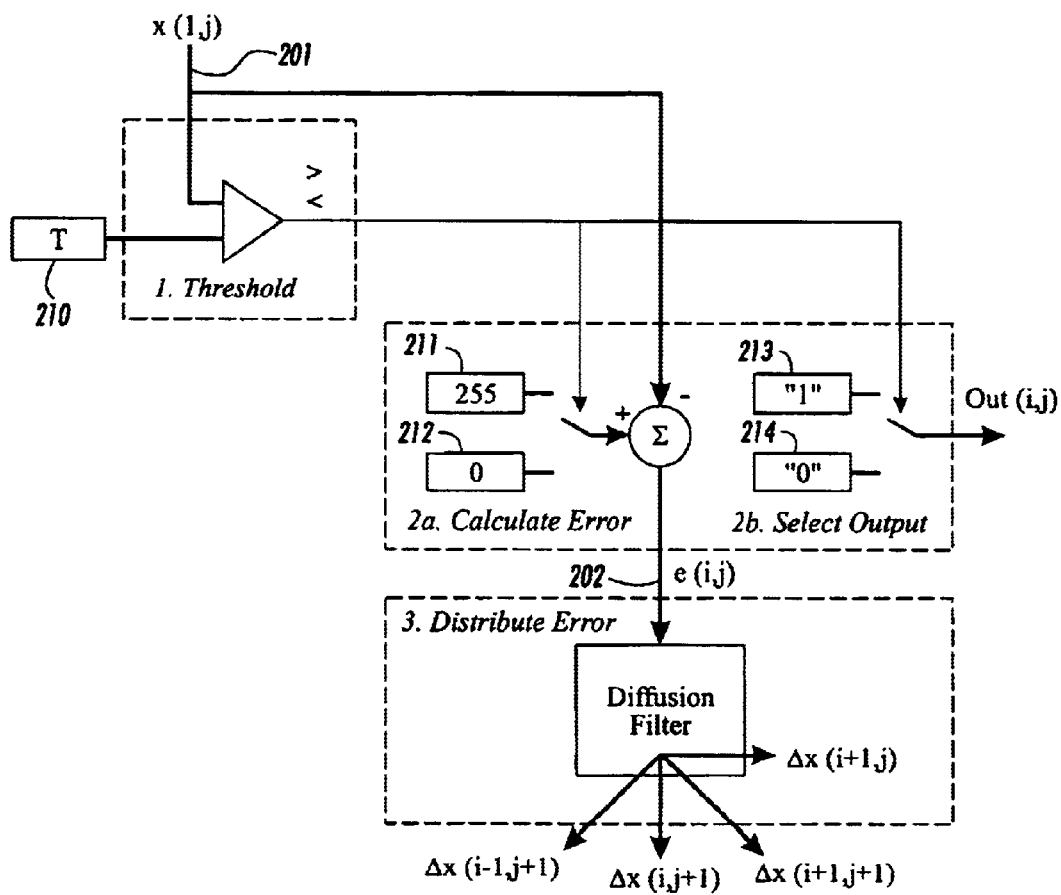
FIG. 2 a prior art figure illustrating the steps performed during error diffusion on each pixel of each color separation of a color image performed by the circuits according to the present invention.

The process is captured in FIG. 2. The notation here is that x(i,j) 201 is the current pixel value, e(i,j) 202 is the error, and Δx(i,j+1) is the compensation value to the pixel at location (i,j+1). Also, small rectangles 210–214 represent data registers, bold lines indicate busses, and thin lines indicate binary values.

The error diffusion technique was originally designed for binary output devices, whose outcome can only be either on or off. The technique has since been extended to support multi-level output devices in a straightforward manner. The extension to multi-level error diffusion, however, requires multiple decisions per pixel. To illustrate this extension, consider the case where the output device can faithfully reproduce N distinct levels of gray. The conventional application of the multi-level error diffusion requires the use of N−1 thresholds in the second step of FIG. 2. So for each pixel, the incoming value is compared to a sequence of up to N−1 pre-determined thresholds. As long as the incoming value is larger than the current threshold, the process advances to the next threshold and repeats. Once the incoming value is smaller or equal than the current threshold, the comparison cycle is halted and the corresponding gray level is outputted. The error between the incoming value and the output value is then calculated and distributed as before. For the assumed (ideal) device, the thresholds are generally uniformly distributed between 0 and 255 (assuming 8-bit representation). The use of multi-level error diffusion therefore increases the system complexity roughly linearly with N. In reality, the resulting image quality usually does not increase in a similar fashion. The main reason for this is that a marking engine is typically designed to be used as a binary device, and is not capable of consistently reproducing single-pixel gray levels.

The conventional and multi-level error diffusion methods propagate the rendering errors to pixels located to the right and below the current pixel (for a left-to-right scan order) according to a pre-determined rule. However, these methods make the assumption that the output device is ideal—that is, that each output pixel can be individually set to a unique shade of gray without any interaction with its neighboring pixels. This is never the case in practice. For example, toner particles in xerography based devices are charge-related, and therefore are influenced by the state of pixels in their proximity. Similarly, the dyes in ink-jet printers tend to bleed through the paper media and interact with the immediate pixels nearby (unless printing is slowed so much as to allow the paper to fully dry from one pixel to the next). In reality, some type of interaction between neighboring pixels always exists. By taking advantage of the actual (far from ideal) printer behavior, one can significantly increase the image quality, yet with only a modest increase in computational complexity. The optimum solution can only be found by coupling together: (a) Knowledge of the printing process; with (b) Understanding of the human vision system.

The general xerography process is complicated and is influenced by a large number of variables such as temperature, humidity, toner characteristics, developer voltages, etc. It would be very complicated, if not impossible, to precisely characterize and model the process, and even then, the model may be extremely sensitive to small deviations in variable values. Clearly, a simple and effective method that is robust and does not rely on such a complicated model is desired. A solution (for xerography) was found by leveraging the common properties of the underlying marking process.

A key aspect of the xerography-based solution was to (non-symmetrically) focus on the 'highlight' response at the expense of the shadows. Those properties are common to error diffusion in general, particularly since the error diffusion has the poorest response in this area due to the sparse and easily noticeable dots. The conclusion holds true for the case of a thermal or piezo ink jet device.

It should be pointed out that the process according to the present invention is not limited to ink jet, and, in fact, has been demonstrated to be successful with other marking processes (e.g., xerography). By leveraging the common behavior into the design of the error diffusion, one can significantly enhance the output quality. Yet the behavior is very generic, so the design does rely on a precise model and therefore can be made quite robust.

As an example for how the process according to the present invention is utilized, consider the case of extending the conventional binary error diffusion technique to color based on the-above inkjet model. The description provided is not limited to this application, is quite general, and can be successfully extended to handle multiple color separations or other generic printer technologies. Similar to the xerography study, the inkjet highlight region is defined as the area where the dots are sparse and most easily noticeable. Since the dots are sparse, the distance between dots of the same color separation is, on average, large enough to prevent local clot-to-clot interaction (bleed). However, the conventional color error diffusion renders each color separation independently, and therefore the average distance between different color separation dots is not maintained in a similar manner. This leads to the outcome that dots from two or more colors occasionally come close or even overlap, which inevitably creates the secondary and higher interactions previously discussed.

The so-called vector error diffusion goes to a great length of effort to prevent the above situation from occurring. In concept, it tries to place the individual color dots in such locations as to maximize the average distance between any of them. This is why the latter method is more complex and requires the processing of all the color separations at once.

However, it is also quite true that the vector error diffusion solution is an overkill. A necessary and sufficient condition to eliminate the secondary—and higher-order interactions is to ensure that the distance between dots belonging to different color separations is, on average, larger than the maximum interaction distance (MID). Thus a similar quality enhancement can be obtained by separating the dots by more than MID and there is no need to search any further (and especially not for the overall optimum location of all the dots).

Consider, for example, the Xerox Latour 300 dpi inkjet head. Suppose the MID for it is 2 pixels, indicating that any two different color dots that are spaced with at least one pixel gap will not have a significant interaction. Then rather then spacing all the dots uniformly away from each other as in the case of the vector error diffusion—it is sufficient to move them apart to have least one pixel gap on average. High quality inkjet engines would be ideally designed to have the MID inversely proportional to their resolution, or MID=1/dpi (so that two color dots next to each other can be turned on without bleeding). The real device MID for any given print mode can be measured on the actual device. Inkjet devices can sometimes use different types of inks (e.g., a diluted black), so the MID can vary or be different for some of the color pairs.

The Error Diffusion method requires storing at least one line of context in memory. In practice, this context can be quite large, making it not cost-effective to implement on chip using modern technology. It is therefore desirable to reduce the overall system cost by applying compression techniques to significantly reduce the cell size (thereby lowering the total memory size) without compromising the image quality. Due to the random nature of the Error Diffusion technique and the associated high-frequency content, it is well known that it is relatively difficult to compress Error Diffused images. Most standard compression techniques available will fail to produce a significant compression ratio. The same generally holds true for compression of the error sequence, although there is an obviously large reduction in information content in going from 8-bit continuous tone image to binary.

The present invention improves and further enhances the Floyd & Steinberg Error Diffusion technique to remedy the above deficiencies and limitations. Specifically, it offers a new and efficient method to significantly reduce the amount of external memory needed. The present invention combines the following key optimizations.

Choosing a more compact error representation to keep in memory, rather than directly storing the compensated pixel values in memory, a transformation is first made to separate the errors from pixel values such that only the error innovation sequence is encoded. This sequence has the property of being of smaller magnitude, thereby requiring a smaller number of bits (and less memory) to represent.

Compressing the error innovation stream to a much smaller size without introducing significant rendering artifacts. This compression is achieved by quantizing and re-distributing the error in such a manner that the precise local gray level (prior to thresholding) is preserved. In that sense, this quantization can be termed "visually lossless".

The quantizer operates within the Error Diffusion renderer, and in tandem with it, allowing precise control over the performance on a pixel by pixel basis.

The process according to the present invention is designed to provide a "safety valve" to randomly release some of the accumulated error should the error grow to become too large (close to overflow or underflow) due to a particular unfavorable input image sequence, and so allow to recover gracefully without noticeable rendering artifacts.

It can be shown that the quantization process according to the present invention produces an enhancement similar to the result of noise injection (thus assisting to eliminate the "worming artifacts"), yet with no perceived increase in image "graininess".

Figure 3:
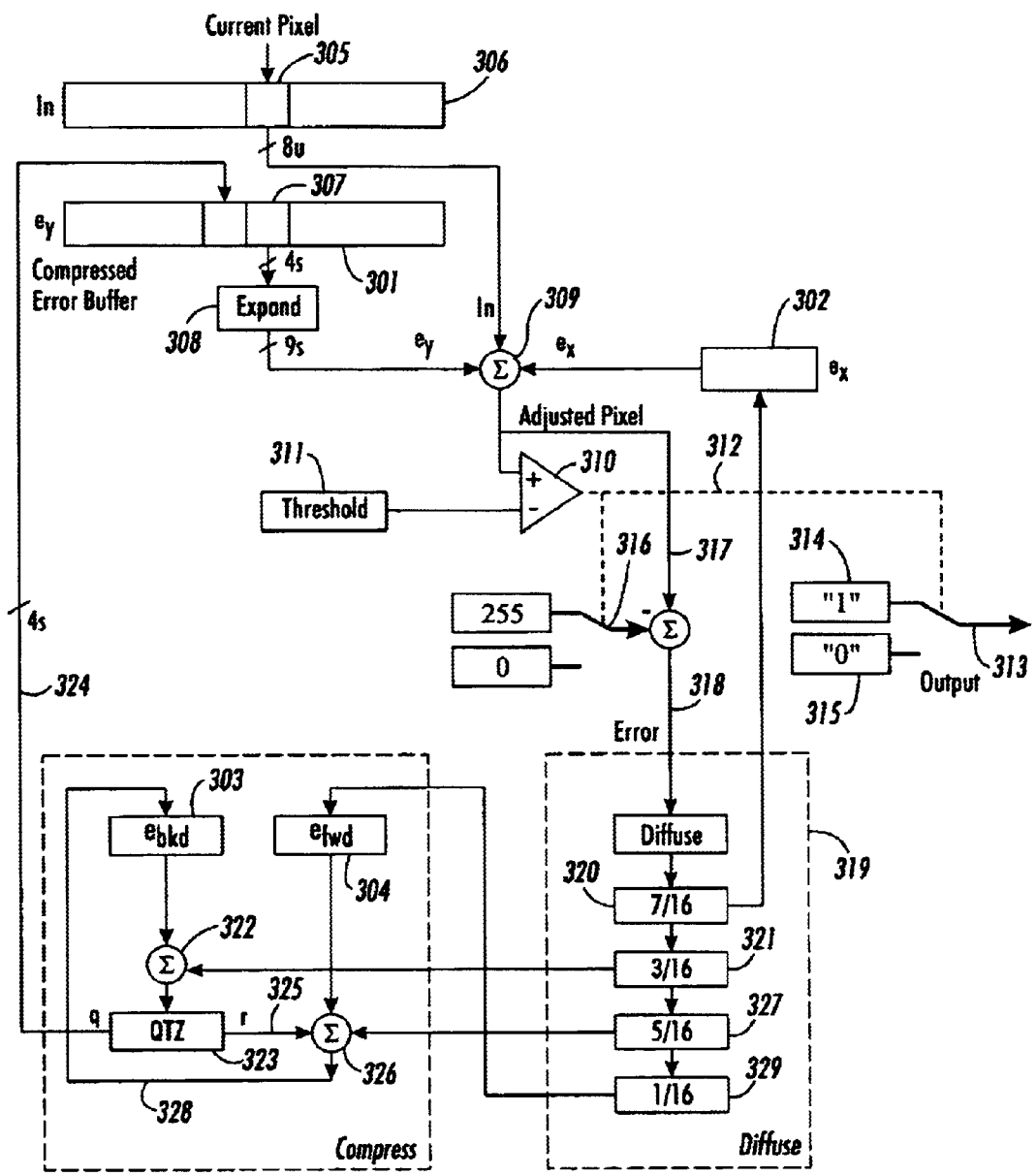
FIG. 3 illustrates an error diffusion implementation suitable for processing each color separation of a color image using the circuits according to the present invention.

The technique according to the present invention has successfully demonstrated a factor of over 2× reduction in external memory size (4 bits per pixel-cell are used), with no noticeable visual degradation in image quality. FIG. 3 illustrates a possible implementation of the technique. The method separates the adjusted pixel error into two components: the horizontal error state and the vertical error state. The horizontal error state $e_x$ is the error carried along the line in the fast scan direction of processing. The vertical error state $e_y$ is the error carried in the slow scan direction from the current line to the lines that have not yet been processed. Clearly, the horizontal state is much less costly to handle than the vertical state since the information in it is of much shorter term. The horizontal state is generated and is immediately consumed across several pixels apart. The vertical state information, on the other hand, needs to be preserved across lines. Therefore the greatest reduction in storage size is achieved by applying compression to the vertical state data.

The process according to the present invention requires only a few internal registers in addition to the compressed vertical state buffer 301. For the Floyd-Steinberg example illustrated in FIG. 1, for example, only three additional registers are needed: one register 302 for holding the horizontal state $e_x$, and two other registers 303 and 304 for holding $e_{bkd}$ and $e_{fwd}$, respectively, (whose purpose will be explained as follows).

Referring to FIG. 3, the current pixel 305 is read from the input buffer 306 (In). At the same time, the corresponding compressed vertical error state 307 is fetched from the vertical error buffer 301 ($e_y$). The compressed vertical state 307 is then expanded (decoded) to full bit precision using the expander logic 308. Inside the presently preferred embodiment, for example, the vertical state data 307 is expanded from a 4-bit compressed form to the full 9 signed internal representation. The horizontal state ($e_x$) is kept (uncompressed) in an internal register 302 from the previous error diffusion cycle.

The values of the three quantities above: the current pixel 305, the expanded vertical state $e_y$, and the horizontal state ex are added together by the first adder 309 to generate the adjusted pixel value (that is, the new gray level that compensates for error diffusing all the past pixels up to this point, preserving the original local gray of the image). This value is then compared against one or more thresholds using comparators. For binary error diffusion, a single comparator 310 is sufficient. For multi-level error diffusion, more comparators (and thresholds) may be required. The threshold register 311 (or registers) can either be fixed, or varying from one pixel to the next.

The comparator output 312 is used to select (or multiplex) two things simultaneously. First, it determines the error diffused output symbol 313 (in our simple Floyd-Steinberg binary example, it merely selects between a "1" 314 and a "0" 315 depending on whether the adjusted pixel was larger or smaller than the threshold). In addition, the comparator output 312 also selects the corresponding gray level 316 of the output symbol 313 (being 255 or 0 in the simple binary case, assuming an 8 bit representation). The selected level 316 is then subtracted from the adjusted pixel value 317 to generate the error 318. Note. that the process can be easily extended to support a multi-level error diffusion with multiple decisions, using a number of comparators followed by selection logic.

The error 318 is fed to the "diffuser" logic 319, which calculates the various error magnitudes along the error diffusion filter. For the specfic Floyd-Steinberg example shown in FIG. 1, the diffuser calculates the error values along the (¹⁄₁₆, ³⁄₁₆, ⁵⁄₁₆, ⁷⁄₁₆) filter taps. Care must be taken here to ensure that 100 percent of the error is fully distributed; for otherwise, small errors resulting from finite numerical precision and/or rounding errors may accumulate over the page. With integer filter weights such as in the example above, the diffusion can easily be accomplished by using simple shift and add operations.

The actual diffuser implementation naturally strongly depends on the performance requirements. For maximum speed, all four error taps may be generated at once using parallel logic. If, however, the external device operates at a slower speed (compared with the internal clock speed, as is the case in the preferred embodiment), than the error values can be generated one at a time (thereby reducing the cost by re-configuring and sharing one weight logic multiple times). In the latter case, the sequence in which the taps are calculated can be ordered as to minimize the hardware storage and complexity. Thus, for example, the contents of the 7/16 error tap 320 (corresponding to the new horizontal state) can be generated first, and immediately stored into the $e_x$ register 302, replacing the old value that is no longer needed.

Similarly, the second tap to be calculated is the 3/16 error tap 321, which contains the current error contribution to the pixel (103 in FIG. 1) located immediately below and to the left of the current pixel. This error is added by adder 322 to the content of the backward register $e_{bkd}$ 303 that is accumulating the error contributions for this pixel. Realizing that this contribution is the last remaining piece of adjustment with respect to this pixel, the result can be now written to memory 301 and stored away until it is time to process that pixel. The result is therefore quantized by the quantizer (QTZ 323), compressed to 4 bits 324, and then written back to the error diffusion buffer 301 through the q output. The resulting quantization error 325 (the remainder r output from the QTZ block) is then fed back to modify the value of the forward register $e_{fwd}$ 304. This step is accomplished via the left input of the 3-way adder 326 in FIG. 3. This crucial step, in essence, forwards the remainder error 325 to the next pixel (104 in FIG. 1) on the next line, thereby maintaining the correct gray level overall. Hence, the "compression" process works in tandem with the error diffusion process, to preserve the correct gray level and at the same time to reduce the resulting error stream size. In this sense, the compression is "visually lossless".

The third filter tap to be calculated is the 5/16 weight 327. It carries the error contribution from the current pixel (101 in FIG. 1) to the pixel directly below it (104 in FIG. 1) one line away. The forward register $e_{fwd}$ 304 holds the previous contributions to this pixel. The two contributions 327 and 304 are added together, and the remainder 325 described above, to produce the contribution sum 328. The result 328 is not yet complete, as one contribution from the next pixel (102 in FIG. 1) to be processed, via the 3/16 tap 321, is still missing. The result 328 therefore cannot be written to the error buffer 301 as yet. Instead, the result 328 is moved over to replace the content of the backward register $e_{bkd}$ 303 that has now been freed.

Finally, the last tap (1/16) 329 of error contribution is calculated, and placed in the now free $e_{fwd}$ register 304. Note that the backward register 303 and forward register 304 at the end of the cycle contain exactly the correct information needed for the proceeding cycle. The process can move on to the next pixel (102 in FIG. 1), and repeat itself.

A comment regarding the boundary conditions at the beginning and end of each line: One approach (preferable in hardware implementations) is to increase the line size (and the error buffer 301, respectively) by a few pixels on each side (corresponding to the error diffusion filter width minus one), and assume known values for these (typically either white or replicating the first/last pixel value). A second alternatives is to adjust the filter taps on the first few pixels, as to not protrude beyond the true line limits: For example, the error diffusion filter in the example above, for the first pixel on a line, would combine the 3/16 tap with 5/16 tap, to produce a single straight-down tap of 8/16 weight, etc. The first method has the advantage of keeping the diffusion filter fixed at the expense of line extension (i.e., larger buffer storage, more diffusion cycles).

Note that the process according to the present invention will be efficient with respect to the memory access described earlier regardless of whether the error data is compressed or not. To bypass compression altogether, it is sufficient to eliminate the QTZ block and replace it with a wire that simply transfers the untouched input to the q output 324 (always returning zero at the remainder output r 325). To enable simple, yet significant, compression, a uniform quantization of input space can be applied, in which the QTZ block 323 simply captures just the top few most significant order bits. Or, alternatively, a quantizer can be designed for companding the input space via a non-linear mapping (such as a logarithmic scale, for example) to achieve better compression at the expense of adding a small lookup table. The quantizer design embodied in the preferred embodiment includes the reduction to 4 bits (sign included) with uniform mapping, plus some safety measures to keep the total error under control.

As indicated above, although the technique according to the present invention is illustrated using the Floyd-Steinberg example, the fundamental technique is quite general, and can be customized to work with arbitrary error-diffusion filter, multi-level error diffusion, randomized thresholding, and other quality enhancement variations.

Figure 4:
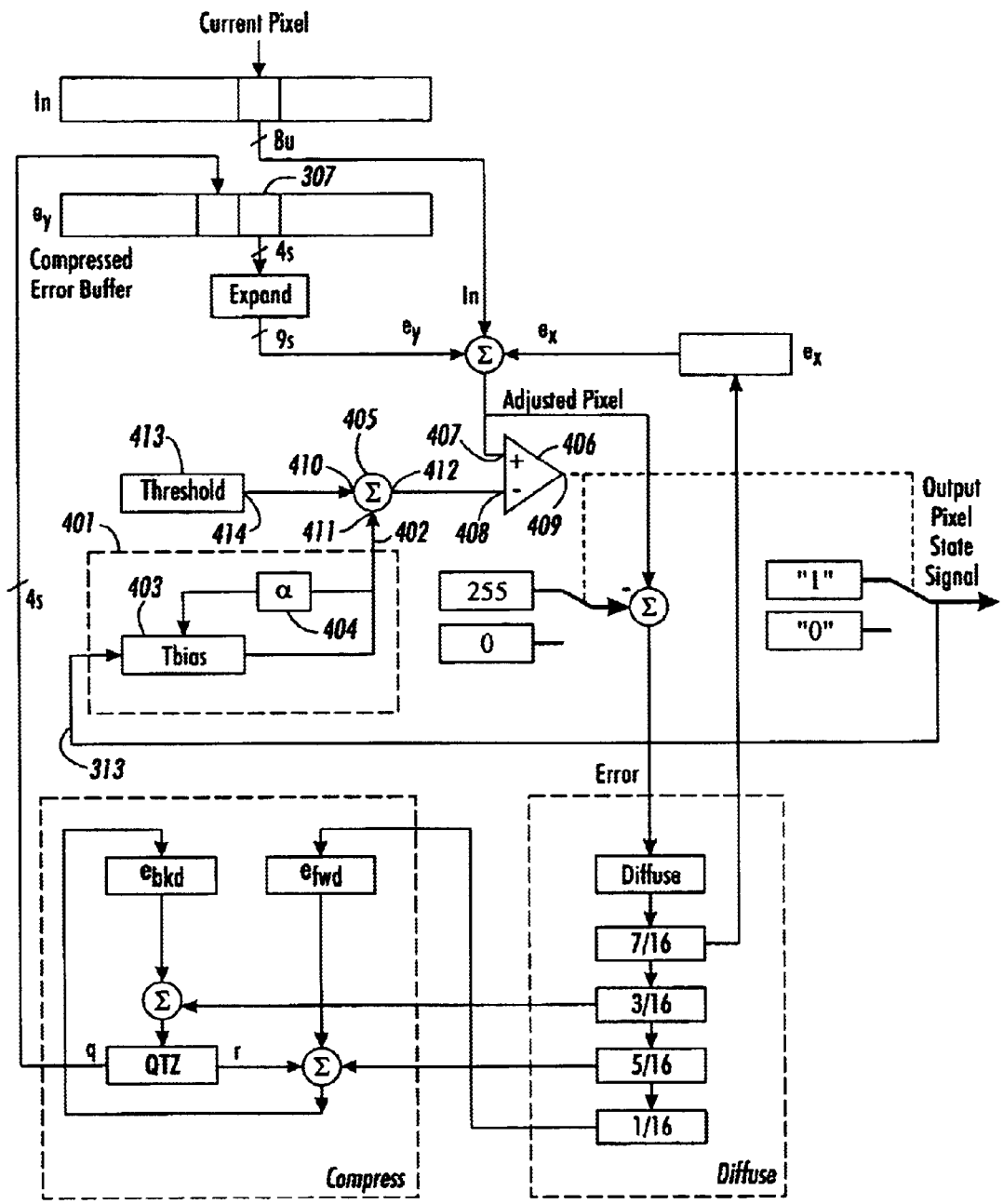
FIG. 4 illustrates an error diffusion implementation having a threshold bias circuit according to the present invention for processing each color separation of a color image using the circuits according to the present invention.

FIG. 4 illustrates another implementation of the process according to the present invention corresponding to the enhanced color error diffusion for inkjet. Comparing the enhanced process according to the present invention shown in FIG. 4 with the process shown in FIG. 3, one observes the introduction of a threshold bias circuitry 401 (in the center left) according to the present invention. With this circuitry according to the preferred embodiment of the present invention, the color separations are processed in a reversed interleaved K→Y→M→C fashion. First, the K separation is processed independently, and the current K pixel is error diffused and outputted. If current K dot is not turned on, no further threshold bias 402 is introduced and the process proceeds with the yellow separation. If, however, a black dot is turned on, a K to Y bias is loaded into the Tbias register 403 (as indicated by the output 313 feedback mechanism).

As the process moves on to the yellow separation, this bias is added to the yellow threshold, raising its value, and thereby reducing the likelihood that a yellow dot will also be outputted at this location (on top of the black dot). However, the resulting yellow error is calculated and propagated to the yellow pixels nearby, making it more likely to render a yellow dot during the following Y cycles. Typically, the K to Y bias is made fairly strong, for otherwise the yellow dot would be mostly lost if rendered on top of the black. Of course, this would often be the case in the shadows, as there is no likely place for the yellow dot to move to. If the MID extent is larger-than one pixel, a portion of the current yellow Tbias is recycled to the following yellow cycles by the threshold bias recycling circuit 404. Each threshold bias is context switched with the corresponding color separation.

As the process moves on to the following separation (for example M), the threshold bias accumulates the total bias contribution from all previous color separations. For example, if both black and yellow dots were turned on, the total initial bias will be composed of the sum of K to Y bias and Y to M bias, but if, on the other hand, only the yellow dot was on, the bias value would be set to Y to M bias. Typically the Y to M bias would be significantly smaller than the K to Y bias, as the yellow ink is much lighter than black and therefore less prone to interaction. The exact relationship between the various color biases is determined by measuring the specific print engine characteristics.

Figure 5:
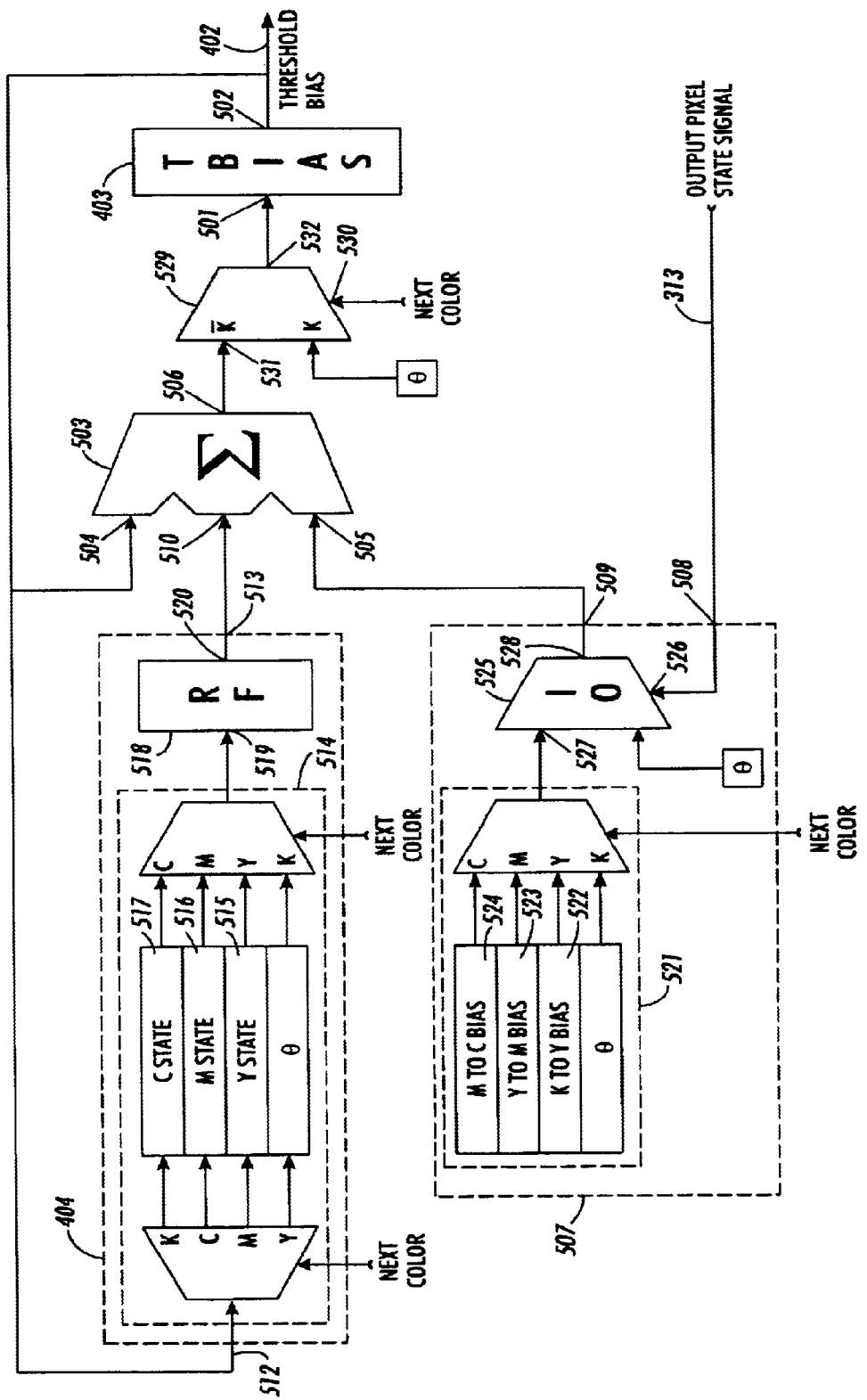
FIG. 5 illustrates a threshold bias circuit for generating a threshold bias signal for processing four color separations representing a color image in a reverse interleaved fashion according to the present invention.

The implementation of the above decision logic is illustrated in FIG. 5, which illustrates a circuit 401 for generating a threshold bias signal 402 for processing n color separations representing a color image according to the present invention. The circuit 401 includes a threshold bias register 403 having a threshold bias input 501 and having a threshold bias output 502 for communicating the threshold bias signal 402. The threshold bias register 403 stores the threshold bias value to be applied to the current pixel and separation being processed. The circuit 401 includes a threshold bias adder 503 which has a current threshold bias input 504 that receives feedback from the threshold bias register 403. Thus, the threshold bias output 502 of threshold bias register 403 is coupled to the current threshold bias input 504 of the threshold bias adder 503. The threshold bias adder 503 also includes a threshold bias adjustment input 505 which receives input from a threshold bias adjustment circuit 507. The adjusted threshold bias output 506 of the threshold bias adder 503 communicates an adjusted threshold bias signal to be used during the processing of the next color separation of the same pixel position in the color image.

The circuit 401 includes a threshold bias adjustment circuit 507 having a pixel state input 508 representing the on or off state of the current pixel in the current color separation being processed. Thus, the pixel state input 508 of the threshold bias adjustment circuit 507 is coupled to the output pixel state signal 313 selected by the comparator 406 shown in FIG. 4. The threshold bias adjustment output 509 communicates the threshold bias adjustment signal to the threshold bias adder 503. Thus, the threshold bias adjustment output 509 of the threshold bias adjustment circuit 507 is coupled to the threshold bias adjustment input 505 of the threshold bias adder 503. The threshold bias adjustment circuit 507 is operable to generate one of a plurality of threshold bias adjustment values as the threshold bias adjustment signal in response to the output pixel state signal 313.

In the preferred embodiment of the circuit 401, the plurality of threshold bias adjustment values are the n−1 threshold bias adjustment values corresponding to n−1 of the n color separations. As illustrated in FIG. 5, n is 4, and the color separations are black, yellow, magenta, and cyan color separations.

The circuit 401 is operable to process n corresponding pixels of the n color separations sequentially before proceeding to a next n corresponding pixels of the n color separations. Thus, the circuit processes the color separations in an interleaved fashion. For example, black, yellow, magenta, and cyan color separations are processed for the pixel 101 shown in FIG. 1 before proceeding to pixel 102 shown in FIG. 1.

The circuit 401 resets the threshold bias register 403 before proceeding to the next n corresponding pixels of the n color separations so that the threshold bias signal 402 is zero during processing of a first of the next n corresponding pixels. The cyan color separation for pixel 101 is computed directly before the black color separation for pixel 102. At the end of processing the cyan color separation for pixel 101, the threshold bias register 403 is reset so that it is zero during the processing of the black color separation for pixel 102.

In the preferred embodiment of the circuit 401 for generating a threshold bias signal, the circuit 401 includes a threshold bias recycling circuit 404 for providing feedback from a pixel in a separation to the next pixel in the same separation. Thus, the threshold bias output 502 of the threshold bias register 403 is coupled to the threshold bias recycling input 512 of the threshold bias recycling circuit 404. The threshold bias recycling circuit 404 further includes a recycled threshold bias output 513 for communicating a recycled threshold bias signal which is coupled to a threshold bias recycling input 510 of the threshold bias adder 503 for receiving this recycled input. The threshold bias recycling circuit 404 is operable to generate one of a plurality of previous recycled threshold bias values multiplied by a recycling factor as the recycled threshold bias signal. The multiplier 518 multiplies the previous threshold bias for the color separation by a factor less than one to compute the recycled threshold bias signal. Because the color separations are processed in interleaved fashion, the previous threshold bias for the same color separation is generated n processing cycles previous to the current threshold bias.

Because at the beginning of each new pixel, the first color separation (black in the example shown) is processed with a threshold bias of zero, the plurality of previous recycled threshold bias values needed to process the remaining color separations is n−1 previous recycled threshold bias values corresponding to n−1 of the n color separations.

The circuits according to the present invention for generating output pixel states from adjusted color pixels derived from n color separations representing a color image further include, as illustrated in FIG. 4, a comparator 406 having an adjusted pixel input 407, an adjusted threshold input 408, and a pixel state output 409 for communicating an output pixel state signal 313. The threshold adder 405 includes a threshold input 410 for receiving input from the threshold register 413, a threshold bias input 411 for receiving input from the threshold bias circuit 401, and an adjusted threshold output 412 for communicating an adjusted threshold signal to the comparator 406. Thus, the adjusted threshold output 412 of the threshold adder 405 is coupled to the adjusted threshold input 408 of the comparator 406.

The circuit further includes a threshold register 413 having a threshold output 414 for communicating a threshold signal to the threshold adder 405. Thus, the threshold output 414 of the threshold register 413 is coupled to the threshold input 410 of the threshold adder 405.

In the preferred embodiment of the circuit according to the present invention, the threshold bias recycling circuit 404 includes a threshold bias memory 514 coupled to the threshold bias recycling input 512 of the threshold bias recycling circuit 404 for storing the threshold bias values corresponding to each color separation of the previous pixel. The threshold bias value of the first color separation of each pixel is zero. As described and illustrated herein, the threshold bias value for the black separation for each pixel is zero. Thus, the threshold bias memory 514 has n−1 threshold bias state memory locations 515–517 for storing the n−1 previous threshold bias signals corresponding to n−1 of the n color separations (omitting black in the illustrated example). For example, when the next color separation to be processed is magenta, then the current color being processed is yellow. To prepare for the next cycle, the M state (previous threshold bias value during an M cycle) is retrieved from location 516. The current threshold bias value (corresponding to a yellow cycle) is written into the Y state memory location to prepare for the next yellow cycle.

The threshold bias recycling circuit 404 includes a recycling multiplier 518 having a threshold multiplier input 519 and a threshold multiplier output 520 for communicating the recycled threshold bias output 513 of the threshold bias recycling circuit 404. Thus, the threshold multiplier input 519 of the recycling multiplier 518 is coupled to the threshold bias memory 514. It is to be understood that the multiplication factor according to the present invention may be the same for all n colors, or alternatively may vary from color to color.

The threshold bias adjustment circuit 507 according to the present invention includes a threshold bias adjustment memory 521 having n−1 threshold bias adjustment locations 522–524 for storing n−1 threshold bias adjustment values corresponding to n−1 of the n color separations. Because the threshold bias value for the first color pixel in each separation is zero, the threshold bias adjustment value corresponding to the last color pixel in each separation (cyan in the illustrated example) is zero. The K to Y bias value represents the bias introduced when a black dot is turned on for the current pixel. The Y to M bias value represents the bias introduced when the yellow dot is turned on for the current pixel. The M to C bias value represents the bias introduced when a magenta dot is turned on for the current pixel. As discussed above, since C is the last color to be processed before proceeding to the next pixel, there is no C to K bias, which is illustrated by the 0 in the threshold bias adjustment memory 521 shown in FIG. 5.

The threshold bias adjustment circuit 507 further includes a threshold bias adjustment control circuit 525 having a control input 526, a threshold bias adjustment input 527, and having a threshold bias adjustment output 528 for communicating the threshold bias adjustment output 509 of the threshold bias adjustment circuit 507. The control input 526 of the threshold bias adjustment control circuit 525 is coupled to the pixel state output 409 of the comparator 406. The threshold bias adjustment input 527 of the threshold bias adjustment control circuit 525 is coupled to the threshold bias adjustment memory 521. When the output pixel state signal is zero, indicating that the current pixel is turned off in the current separation, then the threshold bias adjustment control circuit 525 outputs zero as the threshold bias adjustment value for the current pixel and separation. Conversely, when the output pixel state signal is one, indicating that the current pixel is turned on in the current separation, then the threshold bias adjustment value corresponding to the current separation is retrieved from the threshold bias adjustment memory 521 and delivered as the threshold bias adjustment value.

The threshold bias control circuit 529 has a control input 530, a next threshold bias input 531, and a next threshold bias output 532 for communicating a next threshold bias signal. The next threshold bias input 531 of the threshold bias control circuit 529 is coupled to the adjusted threshold bias output 506 of the threshold bias adder 503. The next threshold bias output 532 of the threshold bias control circuit 529 is coupled to the threshold bias input 501 of the threshold bias register 403. When the next color to be processed is black, the threshold bias control circuit 529 delivers zero to the threshold bias register. When the next color to be processed is not black, thus is yellow, magenta, or cyan, then the threshold bias control circuit 529 delivers the result from the threshold bias adder 503 to the threshold bias register 403.

Although the present invention has been described in its presently preferred embodiment, that embodiment is offered by way of example, not by way of limitation. It is to be understood that various additions and modifications can be made without departed from the spirit and scope of the present invention. For example, although the present invention has been described with respect to threshold bias circuitry implementations, it is to be understood that the present invention can be applied to alternative circuits and functional implementations which compute the same results. Accordingly, all such additions, modifications, and alternatives are deemed to lie with the spirit and scope of the present invention as set out in the appended claims.

What is claimed is:

1. A circuit for generating a threshold bias signal for processing n color separations representing a color image, the circuit comprising:

a threshold bias register having a threshold bias input and having a threshold bias output for communicating the threshold bias signal;

a threshold bias adder having a current threshold bias input and a threshold bias adjustment input and having an adjusted threshold bias output for communicating an adjusted threshold bias signal, wherein the threshold bias output of threshold bias register is coupled to the current threshold bias input of the threshold bias adder; and a threshold bias adjustment circuit having a pixel state input and a threshold bias adjustment output for communicating a threshold bias adjustment signal, wherein the threshold bias adjustment output of the threshold bias adjustment circuit is coupled to the threshold bias adjustment input of the threshold bias adder, and wherein the pixel state input of the threshold bias adjustment circuit is coupled to a pixel state signal;

wherein the threshold bias adjustment circuit is operable to generate one of a plurality of threshold bias adjustment values as the threshold bias adjustment signal in response to the pixel state signal.

2. A circuit as in claim 1, wherein the plurality of threshold bias adjustment values comprises n−1 threshold bias adjustment values corresponding to n−1 of the n color separations.

3. A circuit as in claim 2, wherein n is 4, and the color separations comprise black, yellow, magenta, and cyan color separations.

4. A circuit as in claim 1, wherein the circuit is operable to process n corresponding pixels of the n color separations sequentially before proceeding to a next n corresponding pixels of the n color separations.

5. A circuit as in claim 4, wherein the circuit is operable to reset the threshold bias register before proceeding to the next n corresponding pixels of the n color separations so that the threshold bias signal is zero during processing of a first of the next n corresponding pixels.

6. A circuit for generating a threshold bias signal for processing n color separations representing a color image, the circuit comprising:

a threshold bias register having a threshold bias input and having a threshold bias output for communicating the threshold bias signal;

a threshold bias adder having a current threshold bias input and a threshold bias recycling input and having an adjusted threshold bias output for communicating an adjusted threshold bias signal, wherein the threshold bias output of threshold bias register is coupled to the current threshold bias input of the threshold bias adder; and a threshold bias recycling circuit having a threshold bias recycling input and having a recycled threshold bias output for communicating a recycled threshold bias signal, wherein the threshold bias output of the threshold bias register is coupled to the threshold bias recycling input of the threshold bias recycling circuit, and wherein the recycled threshold bias output of the threshold bias recycling circuit is coupled to the threshold bias recycling input of the threshold bias adder;

wherein the threshold bias recycling circuit is operable to generate one of a plurality of previous recycled threshold bias values multiplied by a recycling factor as the recycled threshold bias signal.

7. A circuit as in claim 6, wherein the plurality of previous recycled threshold bias values comprises n−1 previous recycled threshold bias values corresponding to n−1 of the n color separations.

8. A circuit as in claim 7, wherein n is 4, and the color separations comprise black, yellow, magenta, and cyan color separations.

9. A circuit as in claim 6, wherein the circuit is operable to process n corresponding pixels of the n color separations sequentially before proceeding to a next n corresponding pixels of the n color separations.

10. A circuit as in claim 9, wherein the circuit is operable to reset the threshold bias register before proceeding to the next n corresponding pixels of the n color separations so that the threshold bias signal is zero during processing of a first of the next n corresponding pixels.

11. A circuit for generating a threshold bias signal for processing n color separations representing a color image, the circuit comprising:

a threshold bias register having a threshold bias input and having a threshold bias output for communicating the threshold bias signal;

a threshold bias adder having a current threshold bias input, a threshold bias adjustment input, and a threshold bias recycling input and having an adjusted threshold bias output for communicating an adjusted threshold bias signal, wherein the threshold bias output of threshold bias register is coupled to the current threshold bias input of the threshold bias adder;

a threshold bias adjustment circuit having a pixel state input and a threshold bias adjustment output for communicating a threshold bias adjustment signal, wherein the threshold bias adjustment output of the threshold bias adjustment circuit is coupled to the threshold bias adjustment input of the threshold bias adder, and wherein the pixel state input of the threshold bias adjustment circuit is coupled to a pixel state signal; and a threshold bias recycling circuit having a threshold bias recycling input and having a recycled threshold bias output for communicating a recycled threshold bias signal, wherein the threshold bias output of the threshold bias register is coupled to the threshold bias recycling input of the threshold bias recycling circuit, and wherein the recycled threshold bias output of the threshold bias recycling circuit is coupled to the threshold bias recycling input of the threshold bias adder;

wherein the threshold bias adjustment circuit is operable to generate one of a plurality of threshold bias adjustment values as the threshold bias adjustment signal in response to the pixel state signal; and wherein the threshold bias recycling circuit is operable to generate one of a plurality of previous recycled threshold bias values multiplied by a recycling factor as the recycled threshold bias signal.

12. A circuit as in claim 11, wherein the plurality of threshold bias adjustment values comprises n−1 threshold bias adjustment values corresponding to n−1 of the n color separations; and wherein the plurality of previous recycled threshold bias values comprises n−1 previous recycled threshold bias values corresponding to n−1 of the n color separations.

13. A circuit as in claim 12, wherein n is 4, and the color separations comprise black, yellow, magenta, and cyan color separations.

14. A circuit as in claim 11, wherein the circuit is operable to process n corresponding pixels of the n color separations sequentially before proceeding to a next n corresponding pixels of the n color separations.

15. A circuit as in claim 14, wherein the circuit is operable to reset the threshold bias register before proceeding to the next n corresponding pixels of the n color separations so that the threshold bias signal is zero during processing of a first of the next n corresponding pixels.

16. A circuit for generating output pixel states from adjusted color pixels derived from n color separations representing a color image, the circuit comprising:

a comparator having an adjusted pixel input and an adjusted threshold input and having a pixel state output for communicating an output pixel state signal;

a threshold adder having a threshold input and a threshold bias input and having an adjusted threshold output for communicating an adjusted threshold signal, wherein the adjusted threshold output of the threshold adder is coupled to the adjusted threshold input of the comparator;

a threshold register having a threshold output for communicating a threshold signal, wherein the threshold output of the threshold register is coupled to the threshold input of the threshold adder;

a threshold bias register having a threshold bias input and having a threshold bias output for communicating a threshold bias signal, wherein the threshold bias output of the threshold bias register is coupled to the threshold bias input of the threshold adder;

a threshold bias adder having a current threshold bias input and a threshold bias adjustment input and having an adjusted threshold bias output for communicating an adjusted threshold bias signal, wherein the threshold bias output of threshold bias register is coupled to the current threshold bias input of the threshold bias adder; and a threshold bias adjustment circuit having a pixel state input and a threshold bias adjustment output for communicating a threshold bias adjustment signal, wherein the threshold bias adjustment output of the threshold bias adjustment circuit is coupled to the threshold bias adjustment input of the threshold bias adder, and wherein the pixel state input of the threshold bias adjustment circuit is coupled to the pixel state output of the comparator.

17. A circuit as in claim 16, further comprising:

a threshold bias recycling circuit having a recycled threshold bias output for communicating a recycled threshold bias signal;

wherein the threshold bias adder further has a threshold bias recycling input, wherein the recycled threshold bias output of the threshold bias recycling circuit is coupled to the threshold bias recycling input of the threshold bias adder.

18. A circuit as in claim 17, wherein the threshold bias recycling circuit further has a threshold bias recycling input, wherein the threshold bias output of the threshold bias register is coupled to the threshold bias recycling input of the threshold bias recycling circuit.

19. A circuit as in claim 18, wherein the threshold bias recycling circuit comprises:

a threshold bias memory coupled to the threshold bias recycling input of the threshold bias recycling circuit, wherein the threshold bias memory has n−1 threshold bias state memory locations for storing n−1 previous threshold bias signals corresponding to n−1 of the n color separations.

20. A circuit as in claim 19, wherein the threshold bias recycling circuit further comprises:

a recycling multiplier having a threshold multiplier input and a threshold multiplier output for communicating the recycled threshold bias output of the threshold bias recycling circuit, wherein the threshold multiplier input of the recycling multiplier is coupled to the threshold bias memory.

21. A circuit as in claim 16, wherein the threshold bias adjustment circuit comprises:

a threshold bias adjustment memory having n−1 threshold bias adjustment locations for storing n−1 threshold bias adjustment values corresponding to n−1 of the n color separations.

22. A circuit as in claim 21, wherein the threshold bias adjustment circuit further comprises:

a threshold bias adjustment control circuit having a control input and a threshold bias adjustment input and having a threshold bias adjustment output for communicating the threshold bias adjustment output of the threshold bias adjustment circuit, wherein the control input of the threshold bias adjustment control circuit is coupled to the pixel state output of the comparator, wherein the threshold bias adjustment input of the threshold bias adjustment control circuit is coupled to the threshold bias adjustment memory.

23. A circuit as in claim 16, further comprising:

a threshold bias control circuit having a control input and a next threshold bias input and having a next threshold bias output for communicating a next threshold bias signal, wherein the next threshold bias input of the threshold bias control circuit is coupled to the adjusted threshold bias output of the threshold bias adder, and wherein the next threshold bias output of the threshold bias control circuit is coupled to the threshold bias input of the threshold bias register.

* * * * *